June 23, 1970 D. W. MURPHY 3,517,224
REGULATED TRANSISTORIZED CURRENT SOURCE
HAVING TEMPERATURE COMPENSATION
Filed Oct. 3, 1966
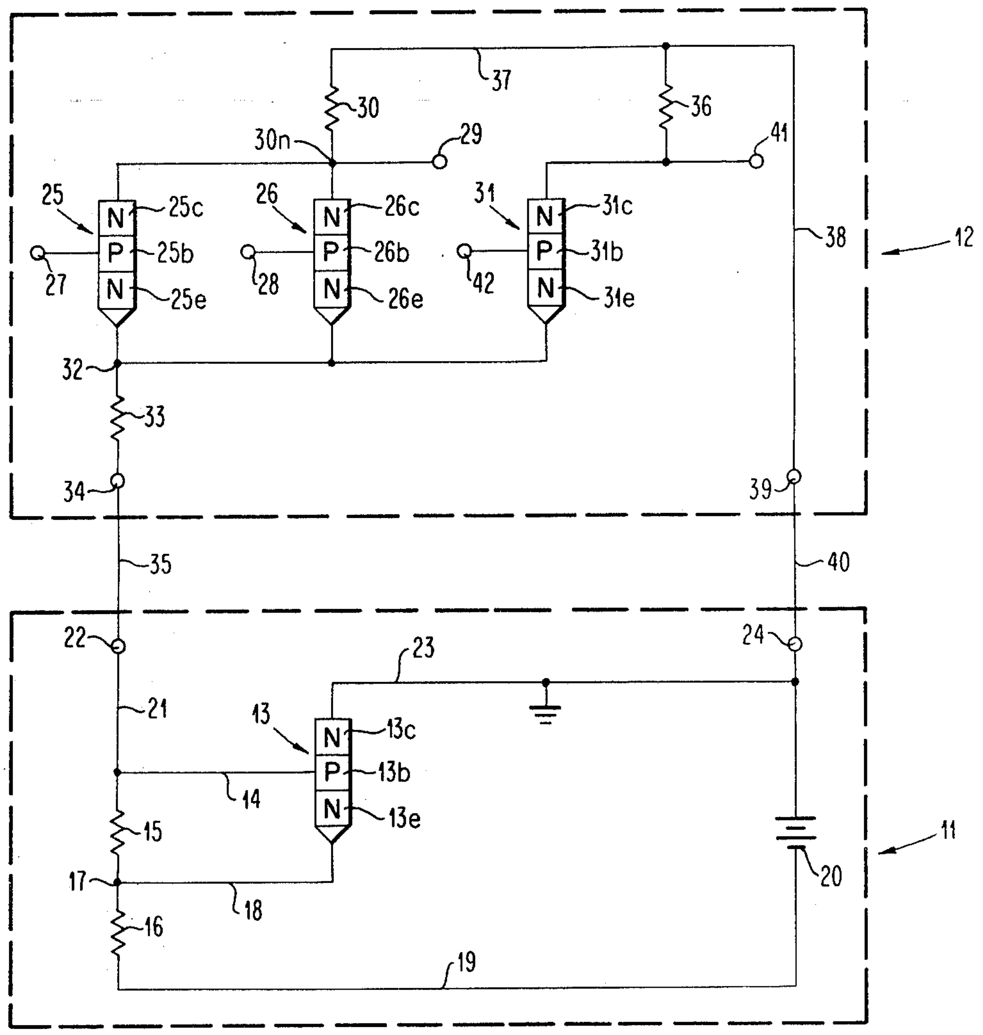
INVENTOR
DANIEL W. MURPHY
BY
ATTORNEY United States Patent Office 3,517,224

Patented June 23, 1970

3,517,224

REGULATED TRANSISTORIZED CURRENT SOURCE HAVING TEMPERATURE COMPENSATION

Daniel W. Murphy, Santa Clara, Calif., assignor to International Business Machines Corporation, Armonk, N.Y., a corporation of New York Filed Oct. 3, 1966, Ser. No. 583,532
Int. Cl. H03k 1/12
U.S. Cl. 307—297 6 Claims

ABSTRACT OF THE DISCLOSURE

A regulated current supply for monolithic circuits including a current source comprising a direct voltage source in series with a resistor which is connected to a transistorized current switch load. A semiconductor active element control means is connected across the load and to the current source resistor means. The load is responsive to an increase in ambient temperature to draw increased load current from the current source. The resistor means is responsive to load current flowing therethrough for producing a voltage drop which controls the conductive state of the active element control means. The active element control means shunts a portion of the load current from the load so as to maintain approximately constant load current with changes in ambient temperature.

This invention relates to current-regulated power supplies, and more particularly, to a power supply particularly adapted for use in combination with current switch logic circuits.

The most advanced form of logic circuit utilized in the present state of the art is the current switch wherein a constantly flowing direct current is switched alternately between at least two transistors having their emitters connected at a common node. The superior speed and other performance characteristics of this type of logic circuit are dependent upon the maintenance of a substantially constant current supply notwithstanding large variations in temperature and loading. For example, if an increase in ambient temperature should increase the current to the point where one or more of the transistors enters the saturation region during its conductive state, the circuit will no longer function properly and may cause a breakdown of the entire computer or other digital apparatus in which the circuit is utilized.

Conventional current-regulated power supplies in accordance with the prior art are therefore particularly disadvantageous when used in combination with current-switch type logic circuits in that these power supplies have a positive temperature coefficient and therefore an output current which is a direct function of the ambient temperature. Since the current conducted by the transistors of the current switch is also a direct function of temperature, the conventional power supplies tend to increase the danger of running into saturation.

It is therefore a primary object of the present invention to provide a current-regulated power supply having a negative temperature coefficient so that the magnitude of the output current varies as an inverse function of the ambient temperature, rather than a direct function, thereby counteracting any tendency of the current switch or other load to draw a load current variable as a direct function of the temperature.

Another object is to provide a novel current-regulated supply having a conducting element in series with the load and a control means responsive to the current flowing through said element to shunt around the load a portion of the current in an amount to maintain approximately constant the current flowing through the load.

This control means is preferably embodied in the form of a transistor operating in the emitter-follower mode. That is, the base of the transistor is connected to one end of the conducting element and its emitter is connected to the other end thereof so as to maintain the voltage constant across said element, thereby maintaining constant the load current flowing through said element.

The collector of the control transistor is connected to the source of direct current flowing to the load. Should the load current tend to increase the resultant increasing voltage across the conducting element is applied to the base-emitter junction of the control transistor thereby causing the latter to draw more current in a shunt path around the load, so as to counteract any tendency of the load current to increase. Conversely, should the load current tend to decrease the control transistor will divert less current from the load so as to counteract this tendency.

The above-noted negative temperature coefficient of the power supply is provided by the control transistor which diverts current from the load as a direct function of the ambient temperature so that the remaining current supplied to the load is an inverse function of the temperature, thereby counteracting any tendency of the load to draw more current with increased ambient temperature.

Still another object of the present invention is to provide a novel combination of a current switch logic circuit and a current-regulated power supply to provide for proper current-mode switching of the logic circuit by maintaining the proper current and voltage levels during the switching operation of the latter.

Other objects and advantages of the subject invention are either inherent in the structure disclosed or will become apparent to those skilled in the art as the detailed description proceeds in connection with the accompanying drawing wherein:

The figure shows a schematic circuit diagram of a current-regulated power supply in accordance with the invention and connected to a current switch logic circuit constituting the load for the supply.

Referring to the drawing in more detail, the current-regulated power supply is enclosed within the dashed-line box indicated generally by the reference numeral 11. The supply provides a constant current to a load illustrated as a current switch logic circuit enclosed within the dashed-line box indicated generally at 12.

Current supply 11 comprises a transistor 13 having its base **13*b* connected by lead 14 to one end of a current sensing resistor 15. The latter is connected in series with another resistor 16 at a junction 17 to which is connected the emitter 13*e* of transistor 13 by a lead 18. The other end of resistor 16 is connected by lead 19 to the negative terminal of a source of electrical energy indicated schematically by the battery symbol 20. Source 20** may be of any conventional construction and the details thereof will not be described because they form no part of the present invention.

The upper end of current sensing resistor 15 is connected by lead 21 to one output terminal 22 of current supply 11. Collector **13*c* of transistor 13 is connected by lead 23 to the other output terminal 24 which is also connected to the positive terminal of potential source 20**.

Current switch 12 comprises a first stage operating in the emitter-follower mode and including a pair of transistors 25, 26 having input terminals 27, 28 connected to their respective bases **25*b*, 26*b*. Collectors 25*c*, 26*c* of transistors 25, 26 are connected to a common node 30*n* to which is connected one end of a collector load resistor 30. The opposite end of the latter is connected by leads 37 and 38 to the supply connection terminal 39 which is adapted to be connected by lead 40 to the positive output terminal 24 of current supply 11**.

The second stage of current switch 12 operates in the grounded-base mode and comprises a transistor 31 having its emitter 31*e* connected at a common node 32 to the respective emitters 25*e*, 26*e* of transistors 25, 26. An emitter load resistor 33 has one end connected to node 32 and its other end connected to a supply connection terminal 34 adapted to be connected by a lead 35 to the negative output terminal 22 of current supply 11. The collector 31*c* of transistor 31 is connected through a load resistor 36 and a lead 38 to supply connection terminal 39. The base 31*b* of transistor 31 is provided with a terminal 42 adapted to be connected in the usual manner to a fixed reference potential source (not shown). The out-of-phase output of current switch 12 is taken off at terminal 29 connected to collectors 25*c*, 26*c* of transistors 25, 26. The in-phase output is taken off at terminal 41 connected to collector 31*c* of transistor 31.

The operation of current supply 11 and current switch 12 is as follows. Current leaving the positive terminal 24 of supply 11 passes through leads 40 and 38 to one or more of the collectors of transistors 25, 26, 31 depending upon the signals at input terminals 27 and 28. If the potentials of both terminals 27, 28 are down, that is, at their lower levels, then both transistors 25 and 26 are cut off so that the current leaving terminal 24 of current supply 11 flows through collector load resistor 36 and then through transistor 31 and emitter resistor 33 and then returns to current supply 11 at output terminal 22 thereof.

Transistor 27 and/or transistor 28 may be turned on by a signal raising the potential at input terminal 27 or input terminal 28 respectively. In this event the potential of the emitter 31*e* of transistor 31 is raised so as to cut off transistor 31, and the current flowing out of output terminal 24 of current supply 11 flows through collector load resistor 30 and then through either or both of transistors 25 and 26. It will thus be seen that the constant current provided by current supply 11 flows through either the first emitter-follower stage comprising transistors 25, 26 or the second grounded-base stage comprising transistor 31, depending upon whether the potential at one of the input terminals 27, 28 is at the upper signal level.

The current regulation of current supply 11 operates in the following manner. The load current passing through current switch 12 leaves the latter at supply connection terminal 34 and returns to terminal 22 of current supply 11 through lead 35. This load current then passes through resistors 15 and 16 in series and then returns through lead 19 to the negative terminal of potential source 20. A portion of the current leaving the positive terminal of source 20 bypasses the load 12 and instead flows through lead 23, transistor 13 and resistor 16 back to the negative terminal of source 20.

The amount of this bypassed current is varied so as to maintain substantially constant the remaining portion of the current leaving source 20 and which is supplied to load 12. This is achieved in the following manner. The load current returning from the terminal 34 of load 12 passes through current sensing resistor 15 on its way back to the negative terminal of potential source 20. The potential across resistor 15 is thus directly proportional to the magnitude of the load current and is applied by leads 14, 18 across the base-emitter junction of transistor 13. Therefore if the load current increases, the potential applied to the base-emitter junction of transistor 13 is increased so as to cause more current to bypass load 12 and flow instead through transistor 13.

Conversely, if the load current decreases the potential across current sensing resistor 15 is reduced, thereby reducing the potential applied to the base-emitter junction of transistor 13 and thereby reducing the amount of current bypassed through the latter and away from load 12. Any tendency to variation of the load current passing through current switch 12 is thereby counteracted by corresponding variations in the base-emitter potential of transistor 13 and resulting current flow through the latter so as to bypass current switch 12 in a greater or lesser amount as required for constant-current regulation.

The operation of current supply 11 may also be understood by considering transistor 13 as operating in an emitter-follower mode. That is, the potential at the emitter 13*e* of transistor 13 will substantially follow any deviation in potential at its base 13*b* so as to maintain substantially constant the voltage drop across resistor 15. This in turn renders substantially constant the current through resistor 15, which current differs from the load current only by the relatively negligible portion of the load current which flows through lead 14 and then through the base-emitter junction of transistor 13. By maintaining the voltage across and current through resistor 15 substantially constant, the load current is thereby regulated.

It will be seen that the current provided by supply 11 to load 12 tends to be an inverse function of the ambient temperature in view of the following considerations. As the ambient temperature increases the collector -to-emitter current to transistor 13 tends to increases for a given voltage applied across its base-emitter junction, due to the shift of the transconductance characteristic toward the origin with increased junction temperature. The current bypassed around current switch 12 is thus a direct function of the ambient temperature. The non-bypassed portion of the current supplied by source 20 thereby tends to decrease so as to counteract the tendency of the current switch transistors 25, 26, 31 to draw more current with increasing ambient temperature.

While the invention has been particularly shown and described with reference to a preferred embodiment thereof, it will be understood by those skilled in the art that the foregoing and other changes in form and details may be made therein without departing from the spirit and scope of the invention.

I claim:

1. A regulated current supply for supplying direct current comprising:

(a) active element semiconductor load means having first and second input terminals, (b) a source of direct current connected across said first and second input terminals for generating a load current, (c) said source of current including a direct voltage source connected in series with a current conducting means, (d) said load means being responsive to an increase in ambient temperature to draw increased load current from said current source, (e) semiconductor active element control means connected between said first and second input terminals, (f) said current conducting means being responsive to the load current flowing therethrough for producing a voltage which controls the conductive state of said active element control means, and (g) said active element control means being operative in accordance with its conductive state to shunt a portion of the load current from said load means so as to maintain approximately constant load current flowing to said load means with an increase in ambient temperature.

2. A regulated current supply for supplying direct current, as in claim 1 wherein:

(a) said control means comprises a transistor having base, emitter, and collector terminals, and (b) said current conducting element comprising a resistor connected between said base and emitter terminals, and said collector terminal connected to said first input terminal.

3. A regulated current supply for supplying direct current as in claim 2 wherein:

(a) said load means comprises a current switch including at least one transistor having a collector connected to said first input terminal and an emitter connected to said second input terminal.

4. A current-regulated power supply to provide a substantially constant direct current to a varying load, said supply comprising:
(a) a source of direct current,
(b) a current conducting element,
(c) circuit means connecting said source and said element in series with said load,
(d) control means responsive to the current flowing through said element to shunt around the load a portion of the current flowing from said source in an amount to maintain approximately constant the current flowing through said load, said control means further comprising
(e) a transistor having a base, an emitter, and a collector,
(f) means connecting said emitter to one end of said conducting element and said base to the other end thereof, whereby the base-to-emitter voltage of said transistor is proportional to the current flowing through said element and said load,
(g) means connecting said collector to said source and said load,
(h) said current switch including a second transistor having a collector and an emitter,
(i) said load and said supply being mutually connected at a pair of nodes,
(j) a collector load impedance extending from one of said nodes to said last-recited collector,
(k) an emitter load impedance extending from the other of said nodes to said last-recited emitter, and
(l) circuit means connected to said last-recited emitter and constituting an alternate current path with respect to said second transistor when the latter is switched to a non-conducting state.

5. A current-regulated power supply as recited in claim 4 wherein the current through said control means transistor is a direct function of the ambient temperature whereby the control means load current characteristic is an inverse function of the ambient temperature so as to counteract a tendency of the current switch to draw current with a magnitude variable as a direct function of the ambient temperature.

6. A constant-current supply to provide a direct current of substantially constant magnitude to a varying load, said supply comprising:
(a) a direct current source,
(b) a current conducting element,
(c) circuit means connecting said source and said element in series with said load,
(d) transistor means for maintaining the voltage across said element, approximately constant so as to maintain the load current approximately constant,
(e) said transistor means comprises a transistor operating in the emitter-follower mode,
(f) said transistor means includes means for varying the magnitude of the load current as an inverse function of the ambient temperature,
(g) said transistor means comprises a transistor having a collector connected to said load,
(h) a base connected to one end of said conducting element, and an emitter connected the other end of said conducting element,
(i) said current switch including a second transistor having a collector and an emitter,
(j) said load and supply being mutually connected at a pair of nodes,
(k) a collector load impedance extending from one of said nodes to said last-recited collector,
(l) an emitter load impedance extending from the other of said nodes to said last-recited emitter, and
(m) circuit means connected to said last-recited emitter and constituting an alternate current path with respect to said second transistor when the latter is switched to a non-conducting state.

References Cited

UNITED STATES PATENTS

| | | | |
|---|---|---|---|
| 3,251,951 | 5/1966 | Meewezen | 307—297 X |
| 3,259,761 | 7/1966 | Narud et al. | 307—215 |
| 3,303,413 | 2/1967 | Warner et al. | 307—297 X |

DONALD D. FORRER, Primary Examiner

U.S. Cl. X.R.

307—215, 310; 323—4; 330—4